(12) United States Patent
Daily et al.

(10) Patent No.: US 7,774,566 B2
(45) Date of Patent: Aug. 10, 2010

(54) PHYSICAL TAPE INTERCHANGE FORMAT

(75) Inventors: Thomas H. Daily, Pinetop, AZ (US);
Gregory T. Kishi, Oro Valley, AZ (US);
Norie Iwasaki, Kanagawa (JP); Kerri R. Shotwell, Tucson, AZ (US); Joseph M. Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 11/697,004

(22) Filed: Apr. 5, 2007

(65) Prior Publication Data
US 2008/0250197 A1  Oct. 9, 2008

(51) Int. Cl.
*G06F 12/00* (2006.01)
*G06F 13/00* (2006.01)
*G06F 13/28* (2006.01)

(52) U.S. Cl. .................. 711/162; 711/111; 711/112; 711/161

(58) Field of Classification Search ............ 711/162
See application file for complete search history.

(56) References Cited

U.S. PATENT DOCUMENTS

| | | | |
|---|---|---|---|
| 6,269,423 B1 * | 7/2001 | Kishi | 711/113 |
| 6,785,786 B1 * | 8/2004 | Gold et al. | 711/162 |
| 6,816,957 B1 * | 11/2004 | Halladay et al. | 711/170 |
| 6,938,120 B2 * | 8/2005 | Gibble et al. | 711/112 |

\* cited by examiner

*Primary Examiner*—Christian P Chace
*Assistant Examiner*—Ryan Bertram
(74) *Attorney, Agent, or Firm*—Rabindranath Dutta; Konrad Raynes & Victor LLP

(57) ABSTRACT

A virtual tape server for executing a method involving a partitioning of a virtual tape volume into a plurality of virtual tape blocks. The virtual tape volume includes a virtual tape volume header having recovery information, each virtual tape block includes a virtual tape block header identifying the virtual tape volume and a block sequence number, and one or more of the virtual tape blocks includes the virtual tape volume header. The method further involves a formatting of a physical tape volume including each virtual tape block.

20 Claims, 8 Drawing Sheets

PHYSICAL TAPE INTERCHANGE FORMAT

FIELD OF THE INVENTION

The present invention generally relates to physical tapes. The present invention specifically relates to a data interchange format for physical tapes.

BACKGROUND OF THE INVENTION

In hierarchical virtual storage systems, intensively used and frequently accessed data is stored in fast but expensive memory. One example of a fast memory is a direct access storage device ("DASD"). In contrast, less frequently accessed data is stored in less expensive but slower memory. Examples of slower memory are tape drives and disk drive arrays. The goal of the hierarchy is to obtain moderately priced, high-capacity storage while maintaining high-speed access to the stored information.

One such hierarchical storage system is a virtual tape storage system ("VTS") including a host data interface, a DASD, and a number of tape devices. When the host writes a logical volume, or a file, to the VTS, the data is stored as a file on the DASD. Although the DASD provides quick access to this data, it will eventually reach full capacity and a backup or secondary storage system will be needed. An IBM 3590 tape cartridge is one example of a tape device that could be used as a backup or secondary storage system.

When the DASD fills to a predetermined threshold, the logical volume data for a selected logical volume is then appended onto a tape cartridge, or a physical volume, with the original left on the DASD for possible cache hits. When a DASD file has been appended to a tape cartridge and the original remains on the DASD, the file is "premigrated."

When the host reads a logical volume from the VTS, a cache hit occurs if the logical volume currently resides on the DASD. If the logical volume is not on the DASD, the storage manager determines which of the physical tape volumes contains the logical volume. The corresponding physical volume is then mounted on one of the tape devices, and the data for the logical volume is transferred back to the DASD from the tape.

Typically, a database containing information that links the logical volumes to their corresponding physical tape volume is maintained by the VTS. Generally, the database is maintained and backed up separately from the data tapes. From time to time, the data may need to be rapidly interchanged between a source VTS and a target VTS, such as, for example, data may need to be exported from the source VTS to the target VTS. Consequently, a precisely defined physical tape format is essential in facilitating efficient and effective data interchanges among several VTS clusters.

SUMMARY OF THE INVENTION

The present invention provides a new and unique physical tape format for facilitating efficient and effective data interchanges among several VTS clusters.

A first form of the present invention is virtual tape server comprising a processor, and a memory storing instructions operable with the processor. The instructions are executed for partitioning a virtual tape volume into a plurality of virtual tape blocks. The virtual tape volume includes a virtual tape volume header having recovery information, each virtual tape block includes a virtual tape block header identifying the virtual tape volume and a block sequence number, and one or more of the virtual tape blocks includes the virtual tape volume header. The instructions are further executed for formatting a physical tape volume including each virtual tape block.

A second form of the present invention is a method comprising a partitioning of a virtual tape volume into a plurality of virtual tape blocks. The virtual tape volume includes a virtual tape volume header having recovery information, each virtual tape block includes a virtual tape block header identifying the virtual tape volume and a block sequence number, and one or more of the virtual tape blocks includes the virtual tape volume header. The method further comprises a formatting of a physical tape volume including each virtual tape block.

The aforementioned forms and additional forms as well as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENT INVENTION

Figure 1:
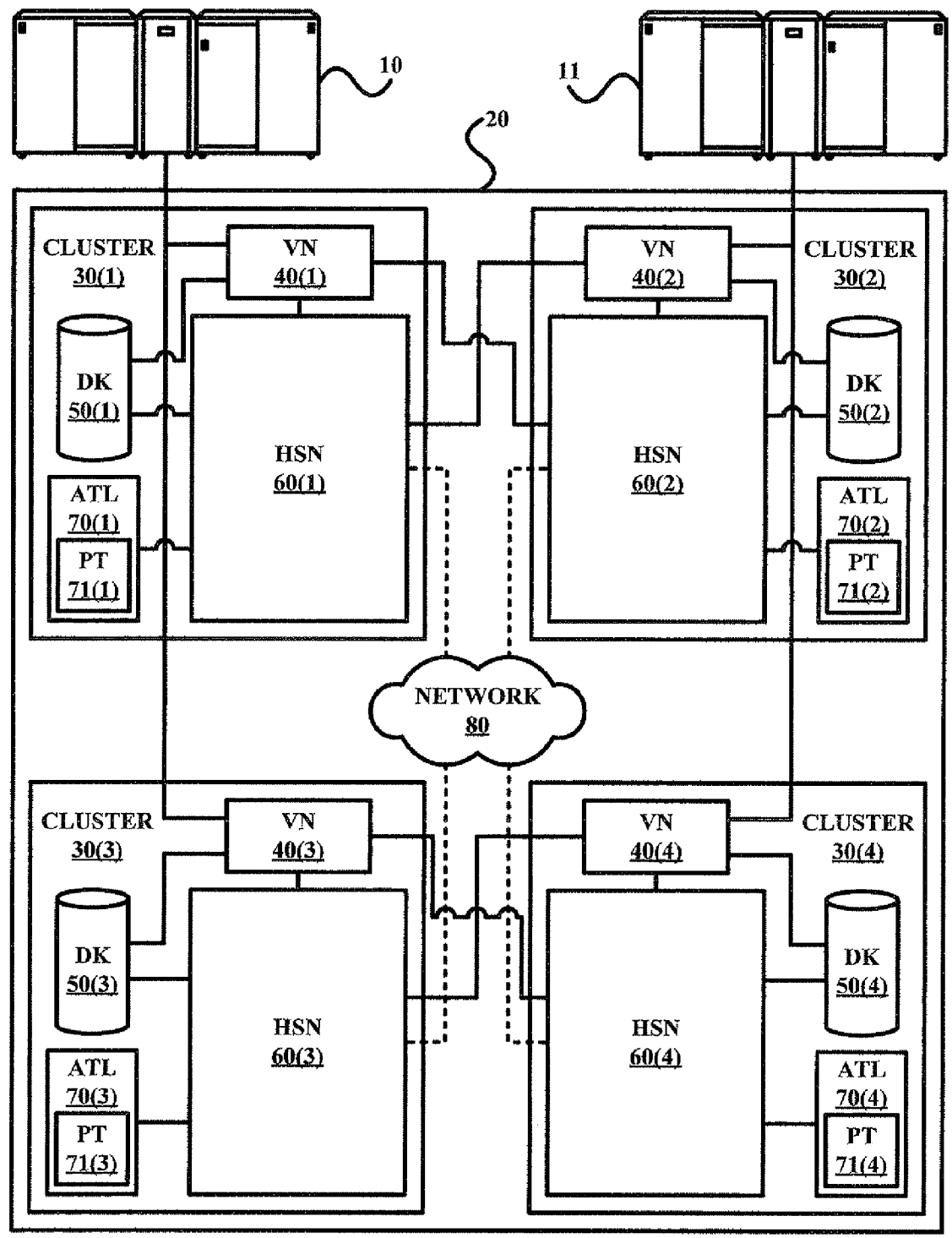
FIG. 1 illustrates one embodiment of a storage domain in accordance with the present invention.

FIG. 1 illustrates a storage domain 20 for serving a pair of hosts 10 and 11. Storage domain 20 employs four (4) virtual tape server clusters 30 interconnected by a network 80 with each cluster 30 including a virtualization node ("VN") 40 and a disk ("DK") 50 for emulating a tape drive to hosts 10 and 11. Each cluster 30 further includes a hierarchical storage node ("HSN") 60 for locally moving data between disk 50 and an automated tape library ("ATL") 70 as well as remotely moving data between a local disk 50 and a remote disk 50.

Figure 2:
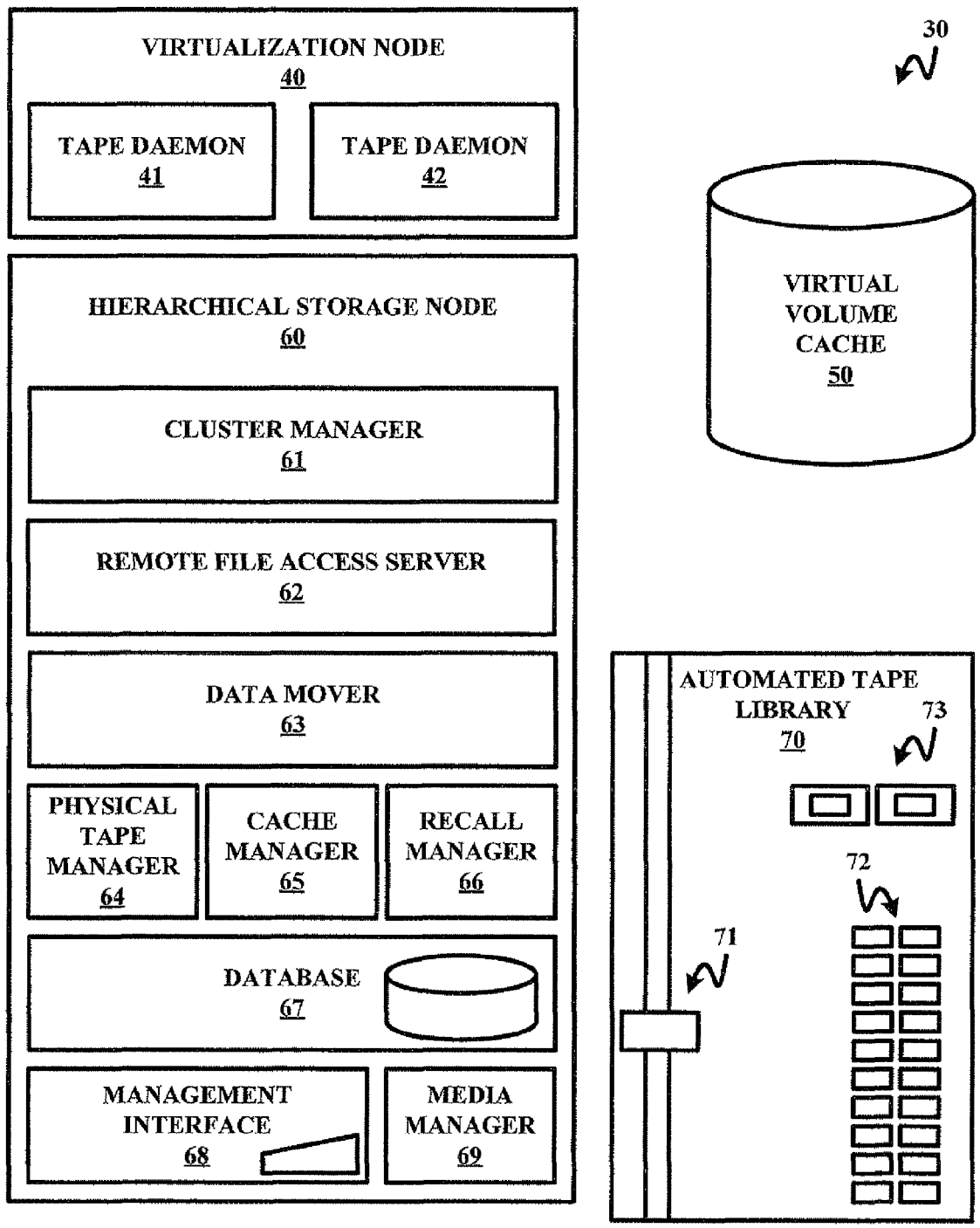
FIG. 2 illustrates one embodiment of a virtual tape server in accordance with the present invention.

In one exemplarily embodiment, as shown in FIG. 2, disk 50 serves as a virtual volume cache containing virtual volumes for local and remote access thereto and library 70 includes a robotic accessor 72 for mounting physical tapes ("PT") 71 in physical tape drives 73 for access to physical volumes stored in physical tapes 71. To this end, virtualization node 40 employs a pair of tape daemons 41 and 42 for operating on virtual volume files residing in either local cache 50 or a remote cache 50 as directed by host 10 or host 11, and hierarchical storage node 60 employs a cluster manager 61, a remote file access server 62, a data mover 63, a physical tape manager 64, a cache manager 65, a recall manager 66, a database 67, a management interface 68 and a media manager 69.

Cluster manager 61 coordinates operations between clusters 30 via tokens that are stored in each cluster's database 67 to determine which cluster 30 has a current copy of data and coordinates copying of data between clusters 30. Remote file access server 62 provides a link to cache 50 by a remote cluster 30. Data mover 63 controls the actual data transfer operations for copies performed between clusters 30 and transfers of data between cache 50 and library 70.

Physical tape manager 64 manages physical tapes 71 in library 70 in multiple physical volume pools, controls reclamation, borrows/returns volumes from a scratch pool, and controls movement of physical tapes 71 between pools. Cache manager 65 controls a copying of data between cache 50 to library 70 and any subsequent removal of a redundant copy of data in cache 50, and provides control signals to balance data flow between cache 50 and other node 60 components. Recall manager 66 queues and controls recalls of data into cache 50 from library 70 on behalf of virtualization node 40 and cluster manager 61.

Management interface 68 provides information about VTS cluster 30 and allows a user control and configuration of cluster 30. Media manager 69 manages the handling of physical tapes 71 and error recovery, and diagnoses errors and determines if the errors were caused by a physical tape drive 73 of library 70 or a physical tape media 71 to thereby take appropriate action.

Figure 3:
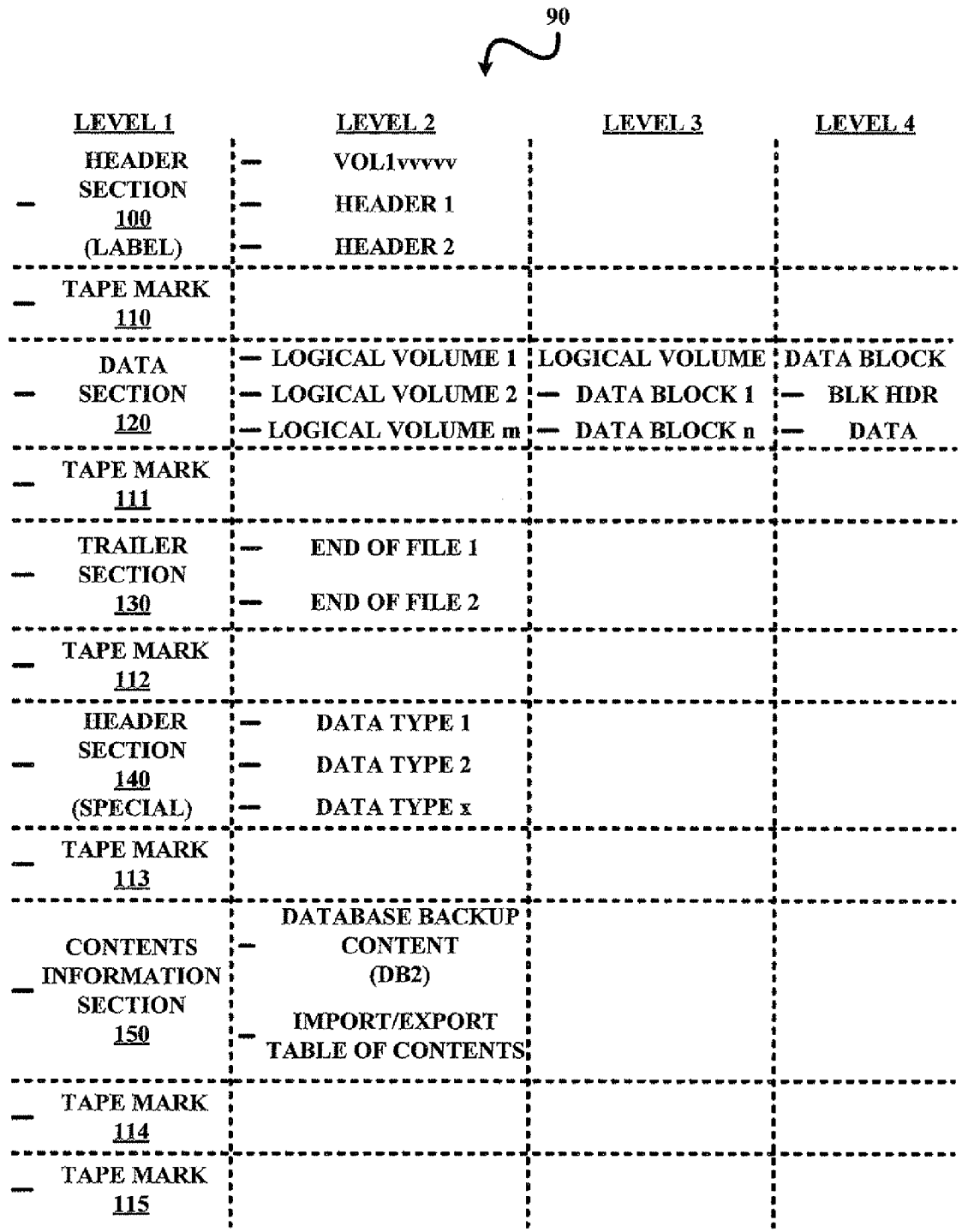
FIG. 3 illustrates one embodiment of a physical tape format in accordance with the present invention.

The present invention is premised on providing a new and unique data interchange segment within a physical tape format of physical tapes 71 residing in automated tape libraries 70 for facilitating effective and efficient rapid data interchange between VTS clusters 30. In one embodiment, as shown in FIG. 3, a physical tape format 90 includes a format level 1 sequentially having a header section 100, a tape mark 110, a data section 120, a tape mark 111, a trailer section 130, a tape mark 112, a header section 140, a tape mark 113, a contents information section 150, a tape mark 114 and a tape mark 115.

Header section 100 is a labeling header having a format level 2 consisting of a volume 1vvvvv heading, a header 1 and a header 2 in accordance with an IBM standard ASCII labeling.

Data section 120 has a format level 2 consisting of an m number of logical volumes (where $m \geq 1$), a format level 3 for each logical volume consisting of an n number of data blocks (where $n \geq 1$), and a format level 4 for each data block consisting of a block header ("BLK HDR") and the data. For error recovery purposes as will be subsequently explained herein in connection with FIGS. 5-7, the block header includes error recovery information, such as, for example, a name of an original virtual volume associated with the logical volume, a sequential block number on the physical volume, a name of the physical volume, a size of the physical volume and a timestamp indicative of when the data block was written to tape.

Trailer section 130 has a format level 2 consisting of an end of file 1 and an end of file 2 in accordance with an IBM standard ASCII format.

Header section 140 and contents information section 150 constitute the data interchange segment of physical tape format 90. Specifically, header section 140 is a special header that includes an enumeration for an x number of data types, such as, for example, backup, import/export TOC and timestamp of creation. This is provided to allow searching tapes for specific types of information (e.g., backups) without actually having to access content information section 150, which has a format level 2 consisting of a database backup content (e.g., DB2 backups) that is created and updated as known in the art and an import/export table of contents that is created in accordance with the present invention upon the logical volumes being selected for export.

The import/export table of contents preferably is an ASCII file that contains a series of lines with each line representing a single logical volume in an exported volume. For example, each line can be a comma delimited entry that contains the following fields shown below:

| Field | Description | Comments |
|---|---|---|
| Physical Volume Name | A name of the physical volume containing export logical volumes | |
| Logical Volume Name | A name of the logical volume | |
| Starting Block | A starting block (record) of the logical volume on the physical volume | |
| Ending Block | An ending block of the logical volume on the physical volume | |
| File Size (Bytes) | A size of the encoded logical volume in bytes (size in file system) | |
| Last Write Compression | A last stored write compression ratio for this file | A value representing 1:1 compression will be used if this data is not in the database |
| Data Level | A last stored data level for this logical volume | This field will not be used on import. It is just used to provide information in case debugging or manual recovery of downlevel volumes is required |
| Storage Group Name | The host storage group name | Need to determine if these can ever contain embedded spaces - if so we may need to compensate for that by using quotation marks |
| Management | The host management | |

-continued

| Field | Description | Comments |
|---|---|---|
| Class Name | class name | |
| Storage Class Name | The host storage class name | |
| Data Class Name | The host data class name | |

Although not required for successful export/import operations, the intention is to sort by physical volume, then by starting block on the physical volume.

An import/export table of contents that is included at the end of a physical volume must include all logical volumes contained on the physical volume. It is assumed that the import/export table of contents may contain records for other physical volumes, requiring the import process to use known methods to determine the records that pertain to a particular physical volume.

Figure 4:
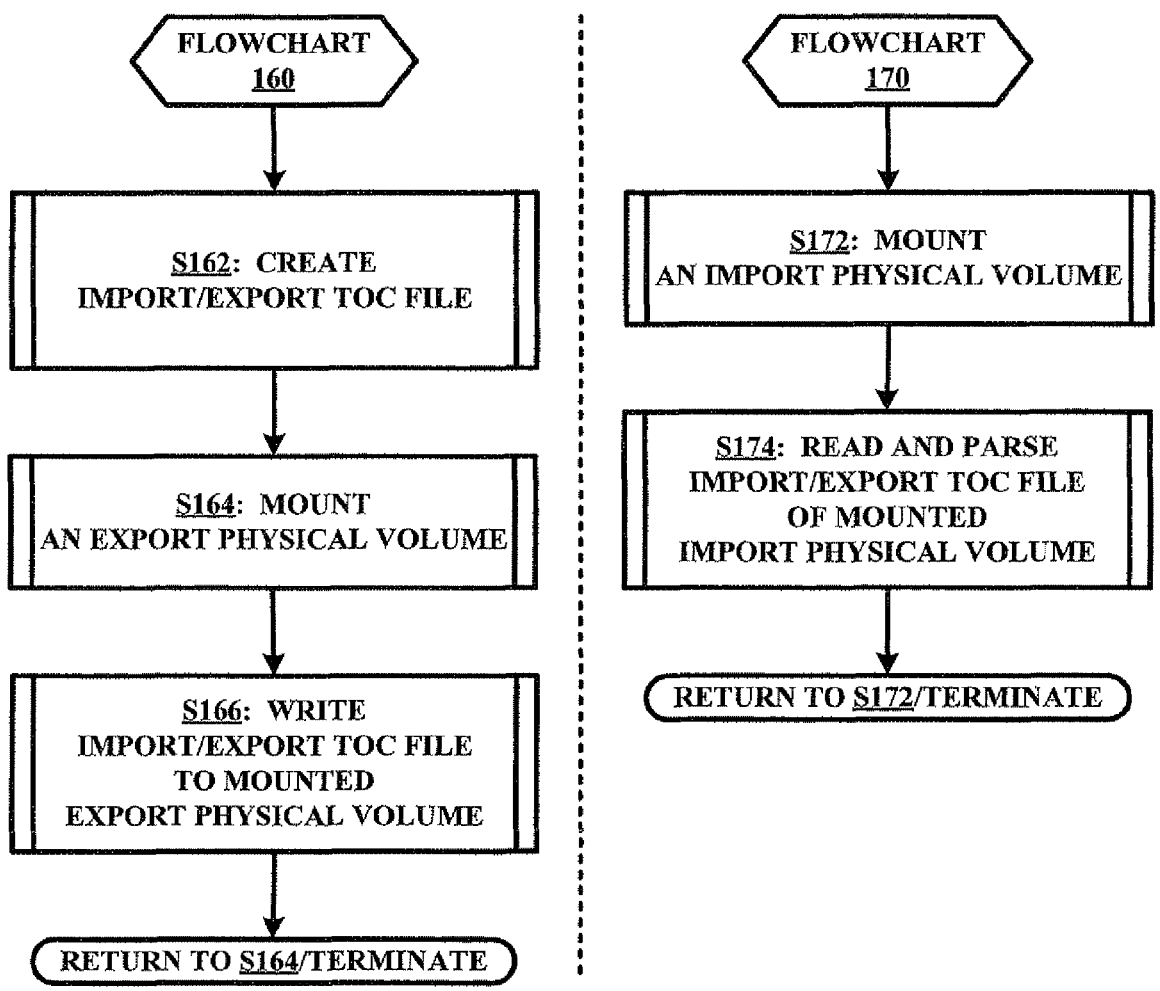
FIG. 4 illustrates flowcharts representative of one embodiment of a physical volume export/import method of the present invention.

FIG. 4 illustrates an export flowchart 160 and an import flowchart 170 representative of a physical volume export/import method of the present invention. During an export/import operation, export flowchart 160 is executed by a source VTS and import flowchart is executed by a target VTS.

Specifically, export flowchart 160 includes a stage S162 for the source VTS to create an import/export table of contents ("TOC") file. In one embodiment, a DB2 interface function is called to supply a file name for import/export TOC file (e.g., export.toc) whereby the DB2 will perform a query that selects data for all logical volumes selected for export with the selected data being sorted by physical volume and then by starting block on the physical volume. Such records can be written in comma delimited form to the file. Also, the query can be a "select" in view of the information being static at the time of the query.

Export flowchart 160 further includes a stage S164 for the source VTS to mount an export physical volume and a stage S166 for the source VTS to write the import/export TOC file to content information section 150 (FIG. 3) of the mounted physical volume with stages S164 and S166 being repeated by the source VTS for each physical volume to be exported. In one embodiment, the file is comma delimited, text readable file whereby it may be prudent to set a drive mode page to compressing when writing this file to the volume and then back to a non-compressing state when the writing of the file is complete.

Complementarily, import flowchart 170 includes a stage S171 for the target VTS to mount an import physical volume and a stage S174 for the target VTS to read and parse the import/export TOC file of the mounted physical volume with records that do not contain the physical volume name being ignored. Each import physical volume can be individually mounted or mounted in groups, particularly for a single import from multiple exports.

As previously stated herein, the physical tape format of the present invention further serves to provide for error recovery/analysis information. Specifically, as shown in FIGS. 5-7, a flowchart 180 representative of an error recovery formatting method of the present invention is implemented by a VTS server based on the physical tape format shown in FIG. 3.

Figure 5:
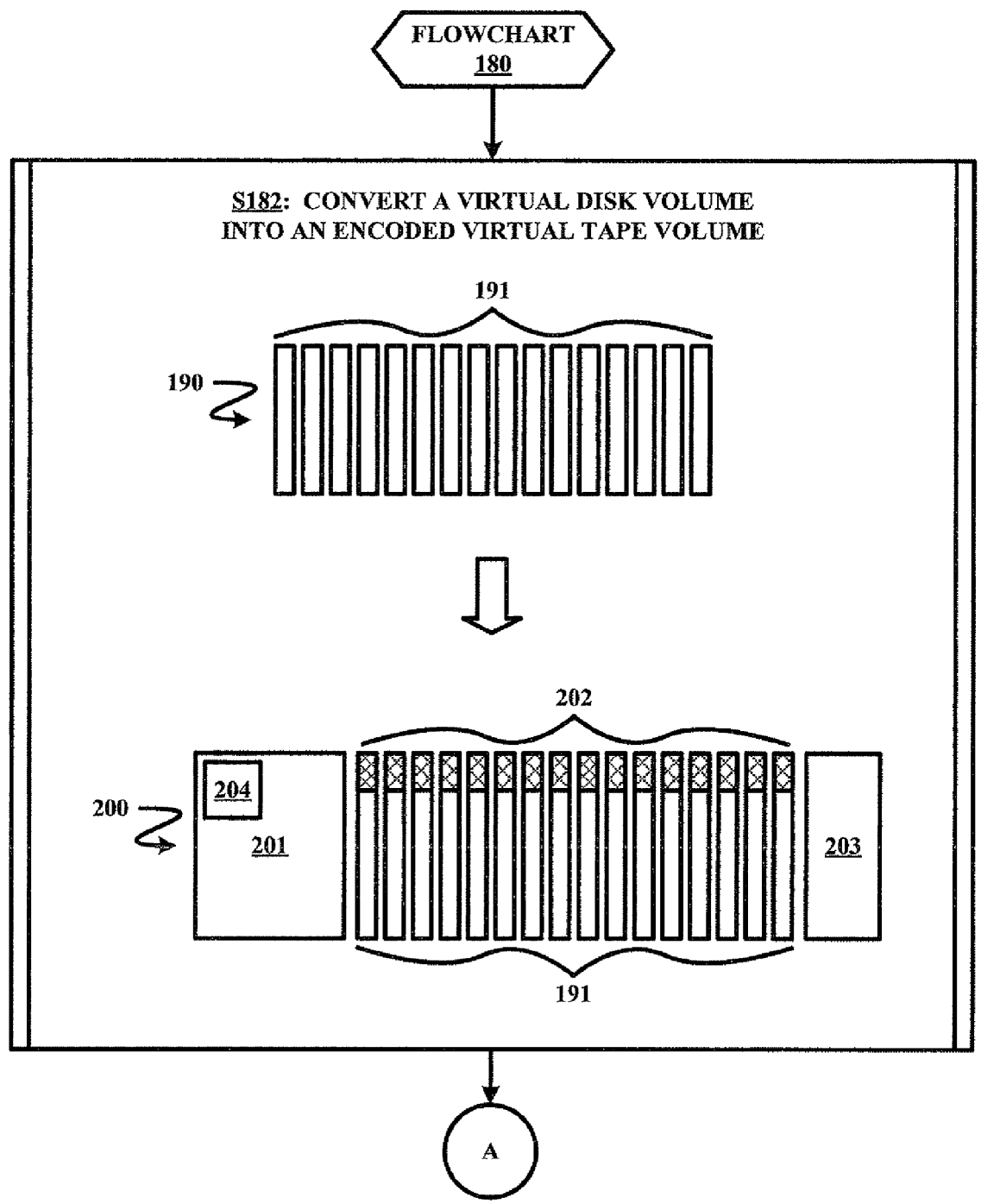
FIGS. 5-7 illustrate a flowchart representative of one embodiment of a error recovery formatting method in accordance with the present invention that is executed by the virtual tape server illustrated in FIG. 1 based on the physical tape format illustrated in FIG. 3.

Referring to FIG. 5, a stage S182 of flowchart 180 encompasses the VTS server converting virtual disk volume into an encoded virtual tape volume. In an exemplarily embodiment as shown in stage S1182, a virtual disk volume 190 consisting of sixteen (16) disk records 191 of any form (e.g., text and/or images) are converted into an encoded virtual tape volume 200 consisting of a virtual tape volume header 201, sixteen (16) virtual tape records and a virtual tape volume trailer 203. Each virtual tape record includes a virtual tape record header 202 appended to a virtual disk record 191. Of particular importance is an insertion of data recovery information 204 within virtual tape volume header 201. Data recovery information 204 includes the new and unique information which in combination facilitates reliable recovery of data within virtual disk records 191 such as, for example, an original name of virtual tape volume 200, a data level of virtual tape volume 200 and insertion information in the form of an insertion level indicative of a number of times virtual tape volume 200 was inserted into a particular VTS cluster or an insertion timestamp indicative of the last time virtual tape volume 200 was inserted into the VTS cluster.

Figure 6:
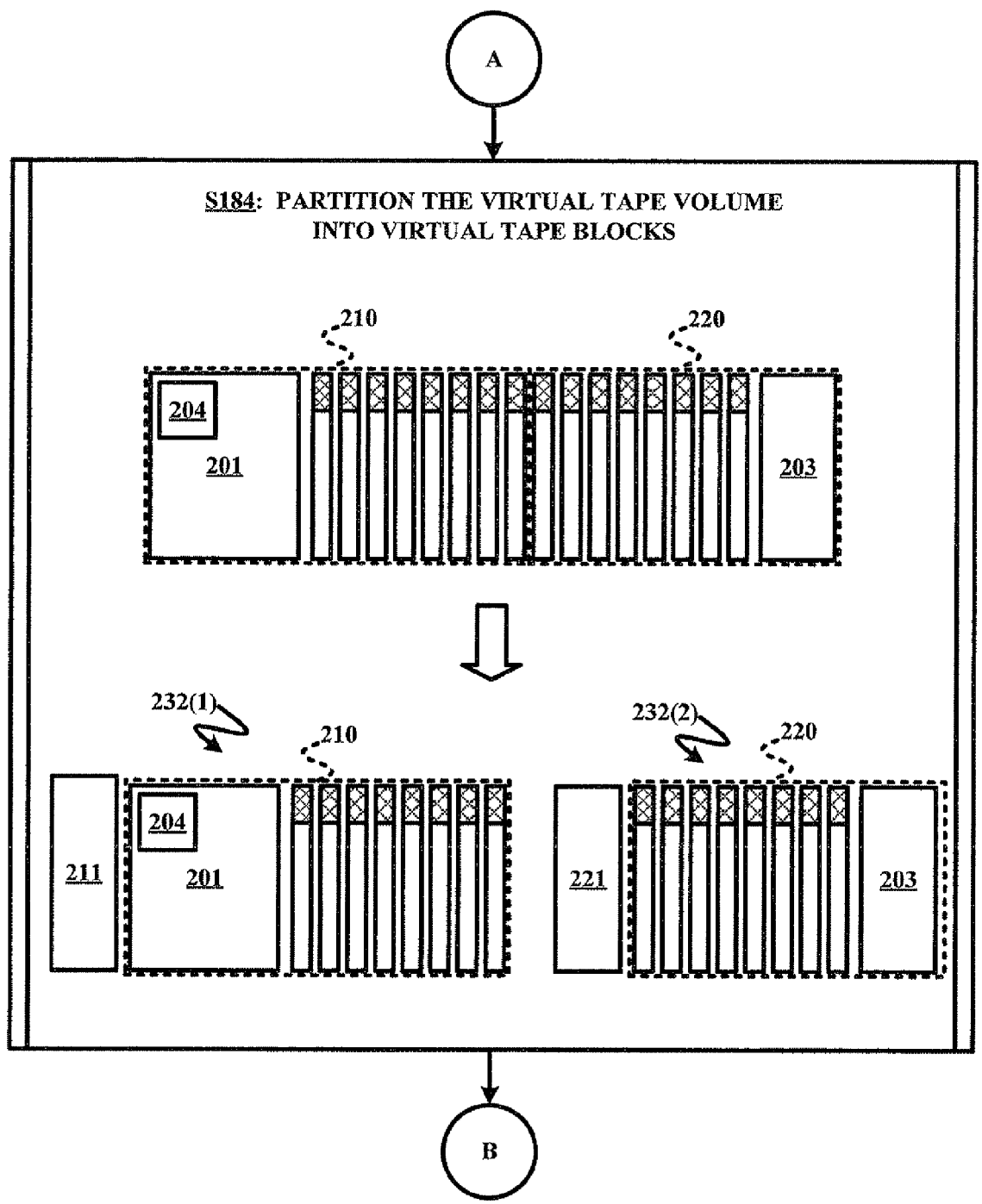

Referring to FIG. 6, a stage S1184 of flowchart 180 encompasses the VTS server partitioning the virtual tape volume into virtual tape blocks. In an exemplarily embodiment as shown in stage S184, the VTS server partitions virtual tape volume 200 (S182) into a data block 210 consisting of virtual tape volume header 201 and the first eight (8) virtual tape records, and a data block 220 consisting of the second eight (8) virtual tape records and virtual tape volume trailer 203. A virtual tape block header 211 is added with data block 210 to form a virtual tape block 232(1), and a virtual tape block header 221 is added with data block 220 to form a virtual tape block 232(2). Virtual tape block headers 211 and 221 include additional recovery information such as, for example, the original name of the virtual tape volume, a sequential block number on a physical tape volume (e.g., N for block 200 and N+1 for block 210), a name of the physical tape volume, a size of the physical tape volume and a timestamp indicative of when the virtual tape block was written to tape.

Figure 7:
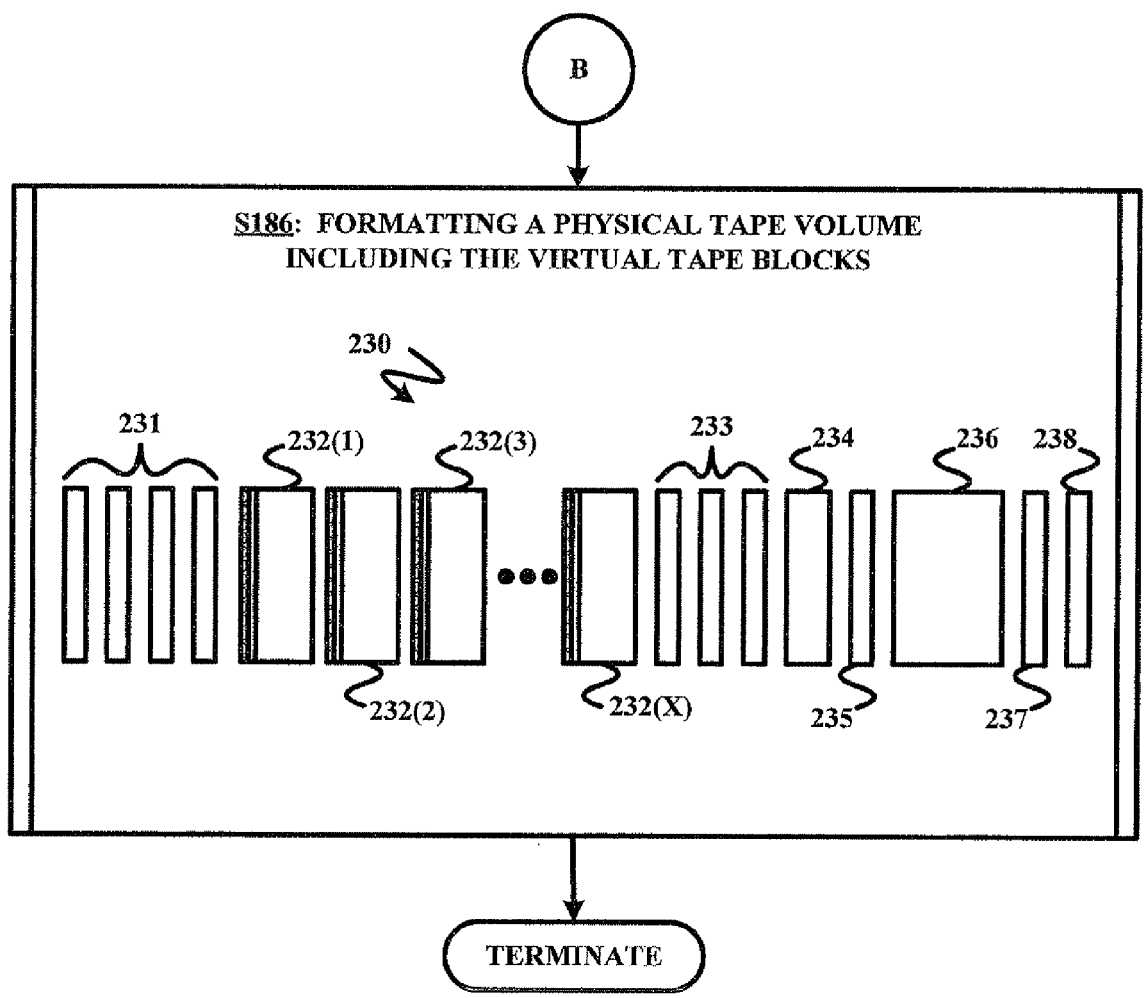

Referring to FIG. 7, a stage S1186 of flowchart 180 encompasses the VTS server formatting a physical tape volume including the virtual tape blocks. In one exemplarily embodiment of stage S1186, the VTS server generates a physical tape volume 230 sequentially including a labeling segment 231 (e.g., Volume 1, Header 1, Header 2, Tape Mark), a X number of virtual tape blocks 232, a trailer segment 233 (e.g., End Of File 1, End of File 2, Tape Mark), a special header section 234, a tape mark 235, a content information section 236 (e.g., Database Backup and Import/Export Table of Contents), a tape mark 237 and a tape mark 238. Of particular importance for is the unique manner by which recovery information is contained with virtual data blocks 232(1) and 232(2) in accordance with stages S182 and S184.

As will now be described herein, a formatting of physical tape volume based on the error recovery formatting method of the present invention is supportive of a data recovery method of the present invention as represented by a flowchart 240 shown in FIG. 8.

Figure 8:
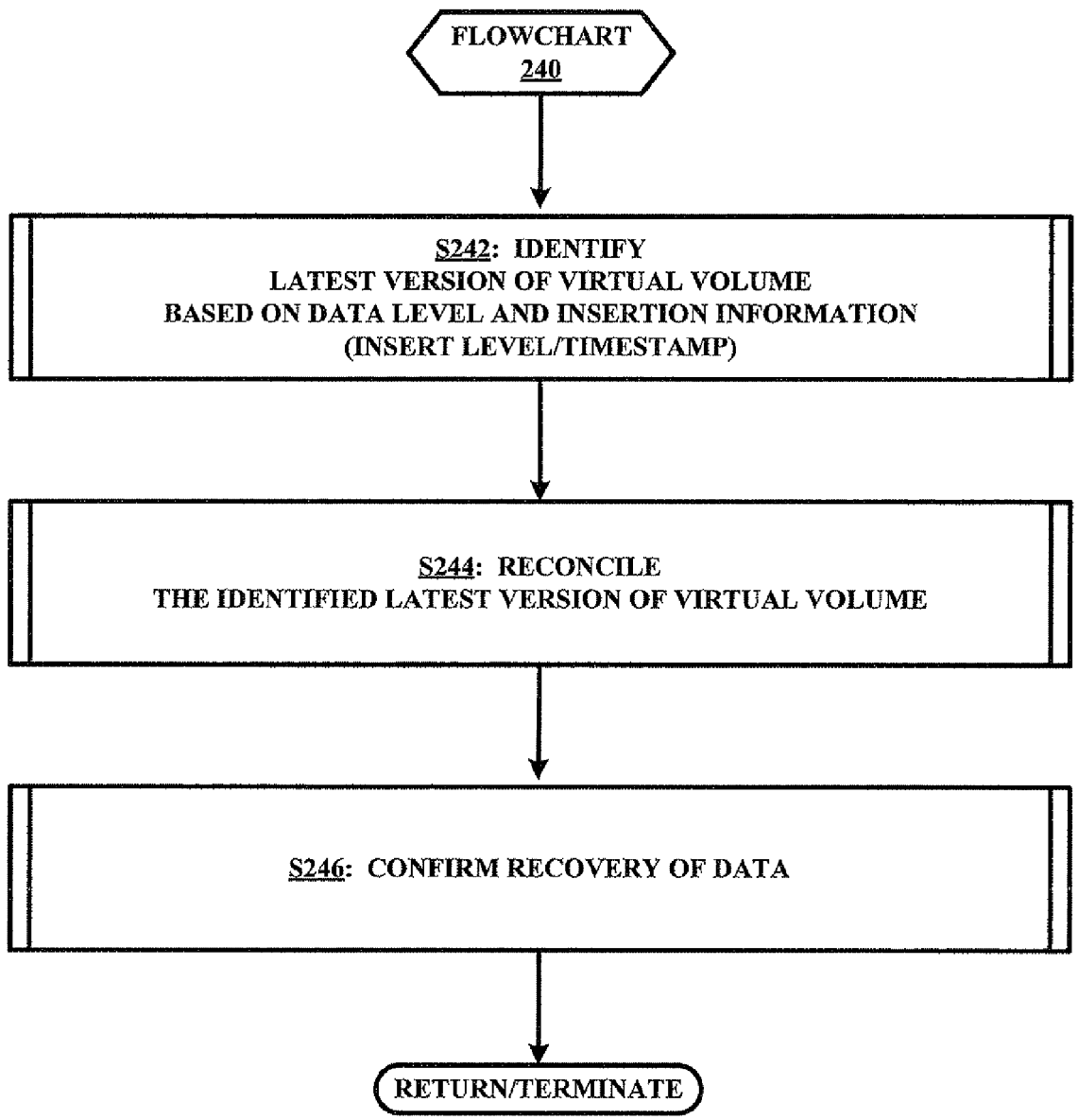
FIG. 8 illustrates a flowchart representative of one embodiment of a data recovery method in accordance with the present invention.

Referring to FIG. 8, a stage S242 of flowchart 240 encompasses a VTS cluster identifying a latest version of a virtual disk volume as residing in cache based on the data level and the insertion information contained in the recovery information of the volume header (e.g., recovery information 204 of volume tape volume header 201 shown in FIG. 5). The insertion information is important for cases where, although rare, the volume was re-inserted into the VTS cluster. Specifically, a data level is counted from an initial value (e.g., 100). A volume could have been rejected at a higher level (e.g., 249) and re-inserted with an initial value (e.g., 100) for the data level. As such, cache momentarily could be storing both the rejected version and the re-inserted version of the volume. Due to the rejected version having a higher level, the VTS server would want to recover the rejected version. However, the insertion information is provided to clarify the re-inserted version as being the latest version. For example, with an insertion level of 1, the VTS cluster would interpret the re-inserted version of the volume actually having a data level that is at least 1 point higher than the rejected version of the volume. Also by example, with an insertion timestamp of the re-inserted version of the volume being more current than a rejected timestamp of the rejected version of the volume, the VTS cluster would assume the re-inserted version of the volume actually has a higher data level than the rejected version of the volume.

A stage S244 of flowchart 240 encompasses the VTS cluster reconciling the identified latest version of the virtual volume with other VTS clusters in the domain. Specifically, if the virtual volume is residing in local cache, each of the other VTS clusters will attempt to identify a latest version of the virtual volume based on the data level and the insertion information contained in the recovery information of the volume header (e.g., recovery information 204 of volume tape volume header 201 shown in FIG. 5).

If verified as being the latest version of the virtual volume, then the VTS server proceeds to a stage S246 of flowchart 240 to confirm the data being recovered is associated with the physical tape volume we expect by reading and analyzing the virtual tape block headers of the physical tape volume (e.g., virtual tape block headers 211 and 221 shown in FIG. 6). If the headers match the virtual volume header (e.g., header 191 shown in FIG. 6), then the virtual volume can be written to tape by the VTS cluster.

An example of implementing flowchart 240 involves three (3) physical tapes at a time t1 and a subsequent t2. At time t1, a physical tape A becomes full with database backup while physical tapes B and C are filled with a data level 110. At time t2, physical tape A is still full with database backup while physical tapes B and C are filled with a data level 200. With a disaster occurring at time t2 and only physical tapes A-C are salvaged (a rare case but possible), the database of physical tape A can be scanned to learn about all of the data on all of the tapes at time t1 (i.e., all data on tape A and data levels 100 on tapes B and C) while flowchart 240 would be used to recover the data corresponding to data level 200 of tapes B and C.

Stages 242-246 of flowchart 240 were described herein as components of a particular data recovery method of the present invention. Nonetheless, stages S242-S246 can be implemented in various forms as needed, such as, for example, as an individual function, or as individually or cooperatively incorporated in other procedures of the VTS server.

Referring to FIGS. 1-8, those having ordinary skill in the art will appreciate numerous benefits and advantages of the present invention including, but not limited to, an effective and efficient data interchange between virtual tape server clusters, particularly for data exportation and data recovery. Those having ordinary skill in the art will further appreciate how to apply the inventive principles of the present invention as related to a physical tape format for more or less complex data storage domains than the data storage domain shown in FIG. 1, and to more or less complex virtual tape servers than the virtual tape server shown in FIG. 2.

Referring to FIGS. 1 and 2, in practice, each VTS cluster 30 may include a processor and a memory for implementing one or more of its components (not shown for clarity purposes). The term "processor" as used herein is broadly defined as one or more processing units of any type for performing all arithmetic and logical operations and for decoding and executing all instructions related to facilitating an implementation by a VTS cluster of the various methods of the present invention. Additionally, the term "memory" as used herein is broadly defined as encompassing all storage space in the form of computer readable mediums of any type within the virtual tape cluster.

Those having ordinary skill in the art may develop other embodiments of the present invention in view of the inventive principles of the present invention described herein. The terms and expression which have been employed in the foregoing specification are used herein as terms of description and not of limitations, and there is no intention in the use of such terms and expressions of excluding equivalents of the features shown and described or portions thereof, it being recognized that the scope of the invention is defined and limited only by the claims which follow.

We claim:

1. A server, comprising:
   a processor; and
   a memory storing instructions operable with the processor, the instructions executed for:
      partitioning a virtual tape volume into a plurality of virtual tape blocks,
         wherein the virtual tape volume includes a virtual tape volume header having recovery information;
         wherein each virtual tape block includes a virtual tape block header identifying the virtual tape volume and a block sequence number,
         wherein at least one of the virtual tape blocks includes the virtual tape volume header; and
      formatting a physical tape volume by including at least each virtual tape block of the plurality of virtual tape blocks within the physical tape volume, wherein by including each virtual tape block within the physical tape volume the recovery information is stored in the physical tape volume; and
      in response to re-inserting a selected volume, if an insertion timestamp of a re-inserted version of the selected volume is more current than a rejected timestamp of a rejected version of the selected volume, determining from the recovery information that the re-inserted version of the selected volume has a higher data level than the rejected version of the selected volume.

2. The server of claim 1, wherein the recovery information identifies a data level contained in the virtual tape volume, wherein a virtual tape server cluster reconciles an identified latest version of the virtual tape volume with other virtual tape server clusters of a domain.

3. The server of claim 2, wherein the data level is represented as at least one of a value and a timestamp.

4. The server of claim 2, the instructions being further executed for:
   restoring the virtual tape volume from a physical tape based on the recovery information of the virtual tape volume header.

5. The server of claim 4, wherein the restoring of the virtual tape volume includes:

locating the virtual tape blocks based on at least one virtual tape block header;

detecting the data level of the virtual tape volume based on at least one of the virtual tape blocks; and determining a most recent version of the virtual tape volume based on the detected data level.

6. The server of claim 1, wherein the recovery information identifies a number of times the virtual tape volume has been inserted into a system.

7. The server of claim 6, wherein the number of times the virtual tape volume has been inserted into the system is represented as at least one of a value and a timestamp.

8. The server of claim 6, wherein the instructions being further executed for: restoring the virtual tape volume from a physical tape based on the recovery information of the virtual tape volume header.

9. The server of claim 8, wherein the restoring of the virtual tape volume includes:

locating the virtual tape blocks based on at least one virtual tape block header;

detecting the number of times the virtual tape volume has been inserted in the system based on at least one of the virtual tape blocks; and determining a most recent version of the virtual tape volume based on the detected number of times the virtual tape volume has been inserted in the system.

10. The server of claim 1, wherein the instructions being further executed for:

performing a database backup of physical tapes; and restoring the virtual tape volume from a physical tape that is less than completely filled at the time of the database backup of the physical tapes.

11. A method, comprising:

partitioning a virtual tape volume into a plurality of virtual tape blocks, wherein the virtual tape volume includes a virtual tape volume header having recovery information, wherein each virtual tape block includes a virtual tape block header identifying the virtual tape volume and a block sequence number, wherein at least one of the virtual tape blocks includes the virtual tape volume header;

formatting a physical tape volume by including at least each virtual tape block of the plurality of virtual tape blocks within the physical tape volume, wherein by including each virtual tape block within the physical tape volume the recovery information is stored in the physical tape volume; and in response to re-inserting a selected volume, if an insertion timestamp of a re-inserted version of the selected volume is more current than a rejected timestamp of a rejected version of the selected volume, determining from the recovery information that the re-inserted version of the selected volume has a higher data level than the rejected version of the selected volume.

12. The method of claim 11, wherein the recovery information identifies a data level contained in the virtual tape volume, wherein a virtual tape server cluster reconciles an identified latest version of the virtual tape volume with other virtual tape server clusters of a domain.

13. The method of claim 12, wherein the data level is represented as at least one of a value and a timestamp.

14. The method of claim 12, further comprising:

restoring the virtual tape volume from a physical tape based on the recovery information of the virtual tape volume header.

15. The method of claim 14, wherein the restoring of the virtual tape volume includes:

locating the virtual tape blocks based on at least one virtual tape block header;

detecting the data level of the virtual tape volume based on at least one of the virtual tape blocks; and determining a most recent version of the virtual tape volume based on the detected data level.

16. The method of claim 11, wherein the recovery information identifies a number of times the virtual tape volume has been inserted into a system.

17. The method of claim 16, wherein the number of times the virtual tape volume has been inserted into the system is represented as at least one of a value and a timestamp.

18. The method of claim 16, further comprising restoring the virtual tape volume from a physical tape based on the recovery information of the virtual tape volume header.

19. The method of claim 18, wherein the restoring of the virtual tape volume includes:

locating the virtual tape blocks based on at least one virtual tape block header;

detecting the number of times the virtual tape volume has been inserted in the system based on at least one of the virtual tape blocks; and determining a most recent version of the virtual tape volume based on the detected number of times the virtual tape volume has been inserted in the system.

20. The method of claim 11, further comprising;

performing a database backup of physical tapes; and restoring the virtual tape volume from a physical tape that is less than completely filled at the time of the database backup of the physical tapes.

* * * * *